3,173,836
METHOD AND COMPOSITIONS FOR THE TREATMENT OF CUTANEOUS HERPETIC INFECTIONS
John J. Gulesich, Philadelphia, and Louis J. Ravin, Plymouth Meeting, Pa., assignors to Smith Kline & French Laboratories, Philadelphia, Pa., a corporation of Pennsylvania
No Drawing. Filed Mar. 1, 1963, Ser. No. 262,218
2 Claims. (Cl. 167—58)

This invention involves a novel method for effectively treating cutaneous herpetic infection and to compositions employed therein.

We have discovered a method for preparing effective topical medicaments for treating cutaneous infections caused by herpes virus, e.g., cold sores. While the active ingredient employed in our preparation, 5-iodo-2'-deoxyuridine has been shown to be effective in herpes infections of the eye, all attempts, both those in our laboratories and those reported in literature, to demonstrate a corresponding effect of herpetic infections of the skin have been unsuccessful. Thus while one might have expected that the action of 5-iodo-2'-deoxyuridine on herpes infections of the cornea would be duplicated in such infections on cutaneous tissue, experience has failed to confirm such a hypothesis. It has been suggested that these difficulties may be traced to a different permeability between the two types of tissues, the presence of substance in the skin which inactivates 5-iodo-2'-deoxyuridine, or a lack of release of the active substance from the pharmaceutical base.

The last theory would appear to be disproven by the fact that even when 5-iodo-2'-deoxyuridine is administered in a variety of pharmaceutical bases, no effect is observed. Preparations employing a petrolatum base are ineffective in cutaneous herpetic infections, even at concentrations of 0.5%. It has been similarly reported that preparations in 0.2% water soluble cream bases failed to demonstrate any therapeutic benefit in cutaneous herpes simplex and no therapeutic effect was observed with aqueous solutions, water soluble cream bases containing up to 10% or with gels containing 2% of 5-iodo-2'-deoxyuridine.

We have discovered quite to the contrary that 5-iodo-2'-deoxyuridine can be effectively employed in herpetic infections of the skin but only when administered in a specific pharmaceutical form prepared in a specific manner. The strict requirements of this preparation as set forth herein are necessitated by our discovery of certain heretofore unrecognized yet critical pharmacological properties of 5-iodo-2'-deoxyuridine.

Our preparation involves the dissolution of 5-iodo-2'-deoxyuridine in an aqueous phase at elevated temperatures up to about 95° C. Generally a temperature of about 60 to 65° C. is preferred since at these temperatures a high degree of dissolution is realized without decomposition. The aqueous phase, primarily purified water, is generally employed in a quantity equal to from about 130 to 300 times the amount by weight of 5-iodo-2'-deoxyuridine, preferably from 130 to 160 times the quantity. Small amounts of preservatives such as ethylparaben, propylparaben or thimerosal may also be optionally added as may various other noncritical components such as humectants, e.g., glycerin, sorbitol and the like.

To this aqueous phase is then added an oleaginous phase which has been heated to approximately the same temperature as the aqueous phase, and an emulsifying agent. The oleaginous phase is employed in a quantity which is about .1 to .25 times the quantity by weight of the aqueous phase and may consist of petrolatum, lanolin, polyglycol esters or the like, together with higher aliphatic alcohols, e.g., cetyl alcohol, stearyl alcohol or the like. The amount of said oleaginous phase is selected from within the above limits so as to render a final preparation containing from about .25 to .75% of 5-iodo-2'-deoxyuridine.

The emulsifying agents, preferably nonionic surfactants such as "Tween 60" (polyoxyethylene sorbitan monostearate), "Arlacel 165" (glycerol monostearate), "Span 60" (sorbitan monostearate), or the like may be added to the oleaginous phase prior to mixing with aqueous phase. These two phases are then thoroughly mixed and the resultant emulsion then permitted to cool.

Application of this preparation to a cutaneous herpetic lesion at a frequency of three to four times a day is an effective method of treatment for this type of infection. This result is in contrast to the previous observations, both of the inventors and of others in the art.

Our finished preparations will thus contain from about 0.25 to 0.75% of 5-iodo-2'-deoxyuridine, all of which are essentially dissolved in the aqueous phase of the emulsion. Higher concentrations, e.g. 10%, are therapeutically equivalent since the major portion of active ingredient at such concentrations is beyond the solubility limit and is not dissolved in the aqueous phase and therefore does not contribute to the therapeutic effect. While the ratios of the aqueous phase to the oleaginous phase may be varied within the prescribed limits to arrive at preparations of various consistencies, the requirement that the 5-iodo-2'-deoxyuridine be dissolved in the aqueous phase coupled with the low solubility of the compound in water, render it desirable to employ a large proportion of water. We have found that a ratio of from about 5 to 4 parts of water for one part of the oleaginous phase (which corresponds to a quantity of oleaginous phase from about .2 to .25 the quantity of the aqueous phase) is highly satisfactory. A typical oleaginous phase for such a preparation could itself be composed of light liquid petrolatum, cetyl alcohol and stearyl alcohol in an approximate ratio of 5:4:6 respectively. Other substances such as lanolin, petrolatum and cetyl alcohol may also be employed.

Depending upon the severity and nature of the particular skin infection, our preparation can be applied 3 times a day or hourly. Generally a regimen of 4 times a day is highly satisfactory for a 0.5% preparation. It is of course apparent that as with any topical preparation the actual quantity of medication applied cannot be specifically designated since the quantity of medicament will depend upon the severity and area of the lesion.

The following examples will serve to further typify the nature of our invention but are not to be construed as a limitation thereof.

*Example 1*

| Ingredients: | Percent w./w. |
|---|---|
| 5-iodo-2'-deoxyuridine | 0.500 |
| Light liquid petrolatum, NF | 5.000 |
| Cetyl alcohol, NF | 4.000 |
| Stearyl alcohol, USP | 6.000 |
| Tween 60 | 2.100 |
| Span 60 | 2.100 |
| Glycerin, USP | 10.000 |
| Ethylparaben | 0.150 |
| Propylparaben, USP | 0.100 |
| Purified water, USP | 70.050 |

The cetyl alcohol, stearyl alcohol, Tween 60 and Span 60 are added to the light liquid petrolatum and the mixture heated to 60–65° C. The aqueous phase consisting of the ethylparaben, propylparaben, glycerin and water is heated to 60–65° C. and to it is added the 5-iodo-2'-deoxyuridine. The mixture is stirred until the 5-iodo-2'-deoxyuridine is dissolved and the oleaginous phase is then added and the preparation allowed to cool while stirring is continued until thickening occurs.

This 0.5% preparation is then applied to cutaneous herpetic infections four times a day.

Example 2

| Ingredients: | Percent w./w. |
|---|---|
| 5-iodo-2'-deoxyuridine | 0.250 |
| Light liquid petrolatum, NF | 5.000 |
| Cetyl alcohol, NF | 4.000 |
| Stearyl alcohol, USP | 6.000 |
| Arlacel 165 | 4.200 |
| Glycerin, USP | 10.000 |
| Ethylparaben | 0.150 |
| Propylparaben, USP | 0.100 |
| Purified water, USP | 70.300 |

The petrolatum, cetyl alcohol, stearyl alcohol and Arlacel 165 are thoroughly mixed at 60° C. The aqueous phase is then prepared by dissolving 5-iodo-2'-deoxyuridine in water, glycerin, ethylparaben and propylparaben at 60° C. The two phases are mixed and stirred while cooling.

Portions of this preparation are then applied to cutaneous herpetic lesions every 2 hours.

Example 3

| Ingredients: | Percent w./w. |
|---|---|
| 5-iodo-2'-deoxyuridine | 0.750 |
| Cetyl alcohol, NF | 5.000 |
| Arlacel 165 | 5.000 |
| Sorbo | 5.000 |
| Thimerosal | 0.002 |
| Purified water, USP | 84.248 |

The 5-iodo-2'-deoxyuridine is dissolved in a mixture of water, ethylparaben and methylparaben at 75° C. There is immediately added upon dissolution a mixture of the Sorbo, Arlacel 165 and cetyl alcohol which has been heated to 70° C. The combined mixtures are stirred and allowed to cool.

This preparation may be applied 3 times a day to herpetic lesions of the skin.

Example 4

| Ingredients: | Percent w./w. |
|---|---|
| 5-iodo-2'-deoxyuridine | 0.500 |
| Cetyl alcohol, NF | 3.000 |
| Arlacel 165 | 12.000 |
| Lanolin | 1.000 |
| Liquid petrolatum | 4.000 |
| Ethylparaben | 0.150 |
| Propylparaben, USP | 0.100 |
| Purified water, USP | 79.25 |

The cetyl alcohol, Arlacel 165, lanolin and liquid petrolatum are mixed at 60–65° C. The 5-iodo-2'-deoxyuridine is dissolved in the purified water at 60–65° C. and to it is added the ethylparaben and propylparaben. These two phases are mixed and allowed to cool.

This preparation is then applied to the site of a herpetic skin lesion 4 times a day.

What is claimed is:

1. The method of effectively treating cutaneous herpetic infections which comprises applying a pharmaceutical preparation to the site of said herpetic infection said pharmaceutical preparation prepared by:
   (a) dissolving a quantity of 5-iodo-2'-deoxyuridine in an aqueous phase at an elevated temperature which is below 95° C., said aqueous phase being present in a quantity from about 130 to about 300 times the quantity of said 5-iodo-2'-deoxyuridine,
   (b) combining said heated aqueous phase with an oleaginous phase containing non-ionic emulsifying agent, said oleaginous phase being heated to an elevated temperature which is below 95° C. and being present in a quantity from about 0.1 to about .25 times the quantity of said aqueous phase, and
   (c) intimately mixing and cooling the mixture of said aqueous phase and said oleaginous phase.

2. The method of preparing a pharmaceutical ointment containing 5-iodo-2'-deoxyuridine which comprises:
   (a) dissolving a quantity of 5-iodo-2'-deoxyuridine in an aqueous phase at an elevated temperature which is below 95° C., said aqueous phase being present in a quantity from about 130 to about 300 times the quantity of said 5-iodo-2'-deoxyuridine,
   (b) combining said heated aqueous phase with an oleaginous phase containing non-ionic emulsifying agent, said oleaginous phase being heated to an elevated temperature which is below 95° C. and being present in a quantity from about 0.1 to about .25 times the quantity of said aqueous phase, and
   (c) intimately mixing and cooling the mixture of said aqueous phase and said oleaginous phase.

References Cited in the file of this patent

Husa: Pharmaceutical Dispensing, third edition, distributed by Husa Brothers, Iowa City, 1947, pages 189–191.

Burnett et al.: Journal of Investigative Dermatology, vol. 40, No. 1, pages 7 and 8, January 1963.